United States Patent
Wasiq et al.

(10) Patent No.: US 10,243,957 B1
(45) Date of Patent: Mar. 26, 2019

(54) PREVENTING LEAKAGE OF COOKIE DATA

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 417 days.

(21) Appl. No.: 14/837,410

(22) Filed: Aug. 27, 2015

(51) Int. Cl.
*H04L 29/06* (2006.01)
*H04L 29/12* (2006.01)

(52) U.S. Cl.
CPC .......... *H04L 63/10* (2013.01); *H04L 61/1511* (2013.01); *H04L 61/6004* (2013.01)

(58) Field of Classification Search
CPC ........ H04L 9/32; H04L 9/3202; G06F 21/604
USPC ................. 726/6–10; 713/162–165; 709/223
See application file for complete search history.

(56) References Cited

U.S. PATENT DOCUMENTS

| | | | | |
|---|---|---|---|---|
| 8,875,243 | B1* | 10/2014 | Cherukumudi | H04L 63/168 713/168 |
| 9,152,820 | B1* | 10/2015 | Pauley, Jr. | G06F 21/6263 |
| 2002/0099809 | A1* | 7/2002 | Lee | H04L 63/0407 709/223 |
| 2006/0155780 | A1* | 7/2006 | Sakairi | G06F 17/30867 |
| 2010/0205297 | A1* | 8/2010 | Sarathy | H04L 43/00 709/224 |
| 2010/0257442 | A1* | 10/2010 | Kembel | G06F 17/30899 715/234 |
| 2010/0332601 | A1* | 12/2010 | Walter | H04L 51/12 709/206 |
| 2011/0154472 | A1* | 6/2011 | Anderson | H04L 63/1408 726/11 |
| 2011/0154473 | A1* | 6/2011 | Anderson | G06F 21/64 726/11 |
| 2011/0191342 | A1* | 8/2011 | Cohen | G06Q 30/02 707/737 |
| 2011/0239124 | A1* | 9/2011 | Tsujimoto | H04N 1/00244 715/741 |
| 2012/0278889 | A1* | 11/2012 | El-Moussa | H04L 63/1425 726/23 |
| 2012/0304286 | A1* | 11/2012 | Croll | G06F 21/6263 726/22 |
| 2012/0324582 | A1* | 12/2012 | Park | H04L 63/1433 726/25 |
| 2013/0086656 | A1* | 4/2013 | Paddon | G01S 19/246 726/6 |

(Continued)

*Primary Examiner* — Lynn D Feild
*Assistant Examiner* — Viral S Lakhia
(74) *Attorney, Agent, or Firm* — Thomas | Horstemeyer, LLP

(57) ABSTRACT

Disclosed are various embodiments for preventing the unintended leakage of cookie data between network sites using a shared high-level domain and vice versa. In one embodiment, a browser application stores data from a first network site having a high-level domain in a client computing device. Access to the data is limited to one or more network sites having the high-level domain. A first classification is assigned to the first network site. A second classification is assigned to a second network site having the high-level domain. The data is sent to the second network site in response to determining that the first classification matches the second classification.

21 Claims, 7 Drawing Sheets

(56) References Cited

U.S. PATENT DOCUMENTS

| | | | |
|---|---|---|---|
| 2013/0111593 A1* | 5/2013 | Shankar | G06F 21/53 |
| | | | 726/25 |
| 2013/0133072 A1* | 5/2013 | Kraitsman | H04L 63/1408 |
| | | | 726/23 |
| 2014/0089661 A1* | 3/2014 | Mahadik | H04L 61/1511 |
| | | | 713/162 |
| 2015/0081876 A1* | 3/2015 | Pieczul | G06F 11/36 |
| | | | 709/224 |
| 2015/0319182 A1* | 11/2015 | Natarajan | G06F 21/53 |
| | | | 726/24 |
| 2016/0119365 A1* | 4/2016 | Barel | H04L 63/1408 |
| | | | 726/12 |
| 2016/0259936 A1* | 9/2016 | Mukherjee | G06F 21/45 |

* cited by examiner

PREVENTING LEAKAGE OF COOKIE DATA

BACKGROUND

The hypertext transfer protocol (HTTP) is the foundational application-level protocol for transfer of data via the World Wide Web. HTTP is considered a stateless protocol. With a stateless protocol, a server is not required by the protocol to track user state across multiple requests. Yet, the concept of sessions is important to the Web. For example, a user may interact with an electronic commerce web site to shop for products, and this may involve numerous different HTTP requests as the user views a succession of pages. To associate the user with a session, the HTTP requests include a unique session identifier. Such an identifier may be included within link and form elements in a given page.

Alternatively, a session identifier may be stored on the client in the form of a cookie. When the user subsequently visits the same site, the client automatically presents the stored cookie data, including the session identifier, to the site. Session cookies may be flushed upon closing of the browser, while persistent cookies may be maintained for an extended period of time. Cookies are now widely used for session management, personalization, tracking, and other uses. An individual cookie may include a name, a value, and zero or more attributes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
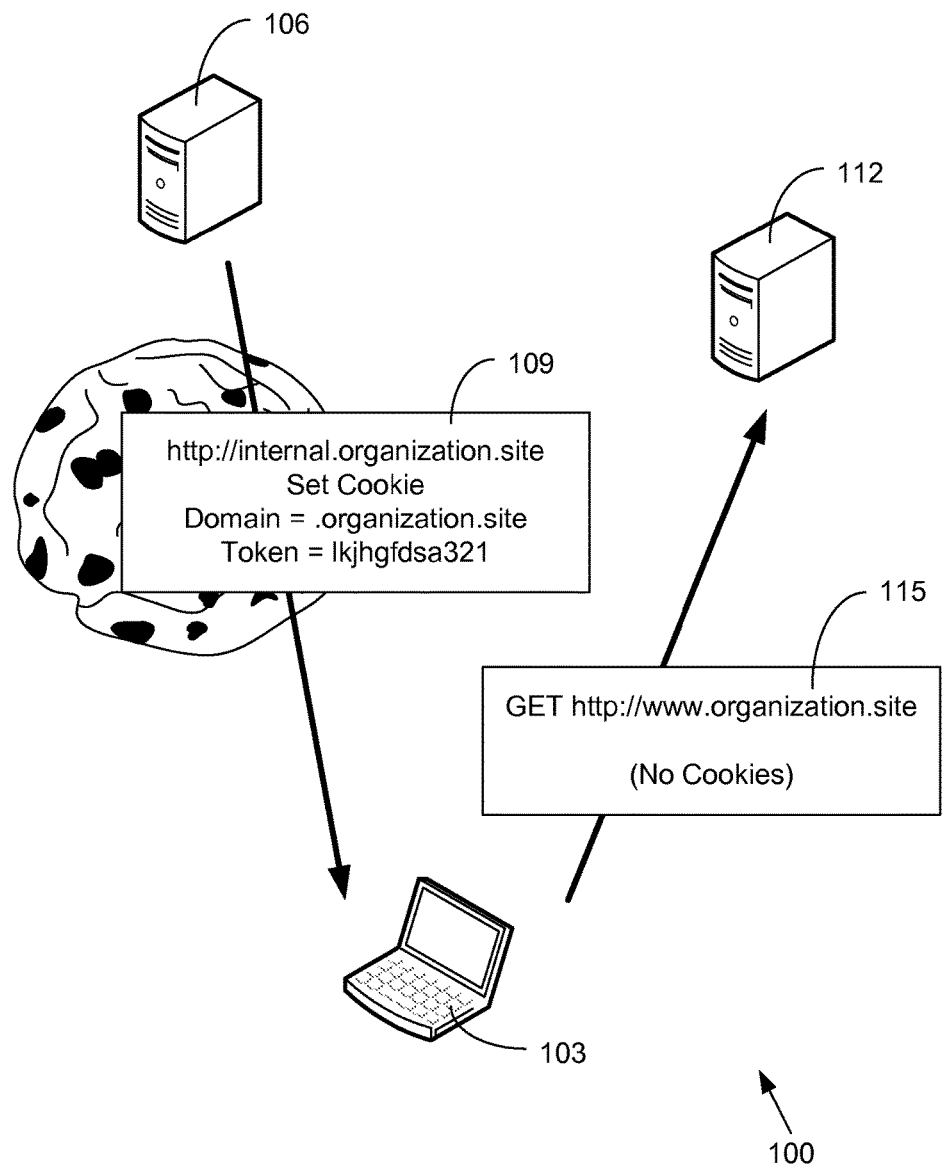
FIG. 1 is a pictorial diagram illustrating an example scenario of preventing leakage of internal cookie data to an external network site according to various embodiments of the present disclosure.

The present disclosure relates to preventing leakage of cookie data declared for shared high-level domains. Cookies may encode sensitive data, and thus it is important that access to them be controlled. A key security concept for cookies is that they are set by a network site and returned only to that network site or a related network site. Specifically, when setting a cookie, a network site specifies a domain, and clients will return the cookie only to network sites matching the specified domain. Cookies can only be set by a network site for the top domain or subdomains of the domain of that network site. For example, a network site at the domain name "www.e-retailer.site" can set a cookie having a domain name of ".e-retailer.site" or "www.e-retailer.site," but not "www2.e-retailer.site" or ".advertising-tracking.site."

If a cookie is set for a high-level domain name, such as ".e-retailer.site" or perhaps even ".site," any subdomain having the high-level domain name will be presented with the cookie. For example, when a cookie is set for ".e-retailer.site," the browser will present the cookie with resource requests from the domains "www.e-retailer.site" and "shoes.e-retailer.site." Setting cookies for high-level domains can be a convenient way to share user information across multiple network sites of an organization that have a high-level domain in common.

Yet, there are situations in which it is troublesome to enable such cookie sharing. For example, a network site at the domain "internal.e-retailer.site" may set a cookie containing sensitive information that is for internal use only within the organization. The site developers may wish for the information to be shared also with "internal2.e-retailer.site," and so the cookie may be set using a high-level domain in common, ".e-retailer.site." However, an unintended consequence of this may be that "www.e-retailer.site," an external site, may have access to this cookie. This potential leakage of cookie data may be considered a security risk.

Various embodiments of the present disclosure prevent leakage of cookie data between internal sites and external sites. Internal sites may be considered as those that are solely for internal purposes of an organization, while external sites may be considered as those which are intended to be accessed by customers or third parties outside of the organization. In some cases, external sites may be accessed by agents of the organization for internal purposes as well. Typically, internal sites are not accessible via the public Internet, meaning that access to them may be blocked by routers, firewalls, or other networking devices. In some cases, internal sites may be accessible only via internal network addresses, while external sites may be accessible via both internal and external network addresses.

In one scenario, a browser plug-in determines whether a site that is setting a high-level domain cookie is an internal or external site. If it is an internal site, the browser will avoid transmitting the cookie to a site that matches the high-level domain but is determined to be an external site. In addition to preventing this leakage of cookie data, situations that may result in unintended cookie data leakage may be discovered and reported. Although the present disclosure primarily references a distinction between internal and external networks of an organization, it may be that a similar distinction may be made between multiple internal networks or external networks of an organization. For example, it may be that data from one site in a first internal network should not be leaked to another site in a second internal network.

Referring now to FIG. 1, shown is a pictorial diagram illustrating an example scenario 100 of preventing leakage of internal cookie data to an external network site according to various embodiments. To begin, the client 103 requests a resource from an internal site 106 at the uniform resource locator (URL) of "http://internal.organization.site." In response, the internal site 106 sets a cookie 109 along with sending the requested resource. The cookie 109 sets a domain of ".organization.site" along with data corresponding to a session token ("Token=lkjhgfdsa321." Ordinarily, the client 103 would be configured to present the cookie when a resource is requested from any site having a domain name matching ".organization.site." This would include, for example, sites having domain names of "organization.site," "www.organization.site," and "internal.organization.site."

However, it may be undesirable to have cookie data from an internal site 106 leaked to an external site 112, even if the external site 112 has a domain name that matches the high-level domain of the cookie (e.g., "www.organization.site"). According to the operation of the embodiments described herein, the client 103 is configured to detect that the external site 112 is external, that the internal site 106 is internal, and then determine that cookies set by internal sites 106 are not to be transferred to external sites 112. Thus, when the client 103 issues a request 115 for a resource of the external site 112, the request 115 does not include the cookie 109. It is noted that this behavior is contrary to the usual behavior of browsers, which would ordinarily provide the cookie 109 irrespective of internal/external site designations, thereby potentially leaking sensitive internal data to external sites 112 that may be more vulnerable to attack than internal sites 106. In the following discussion, a general description of the system and its components is provided, followed by a discussion of the operation of the same.

Figure 2:
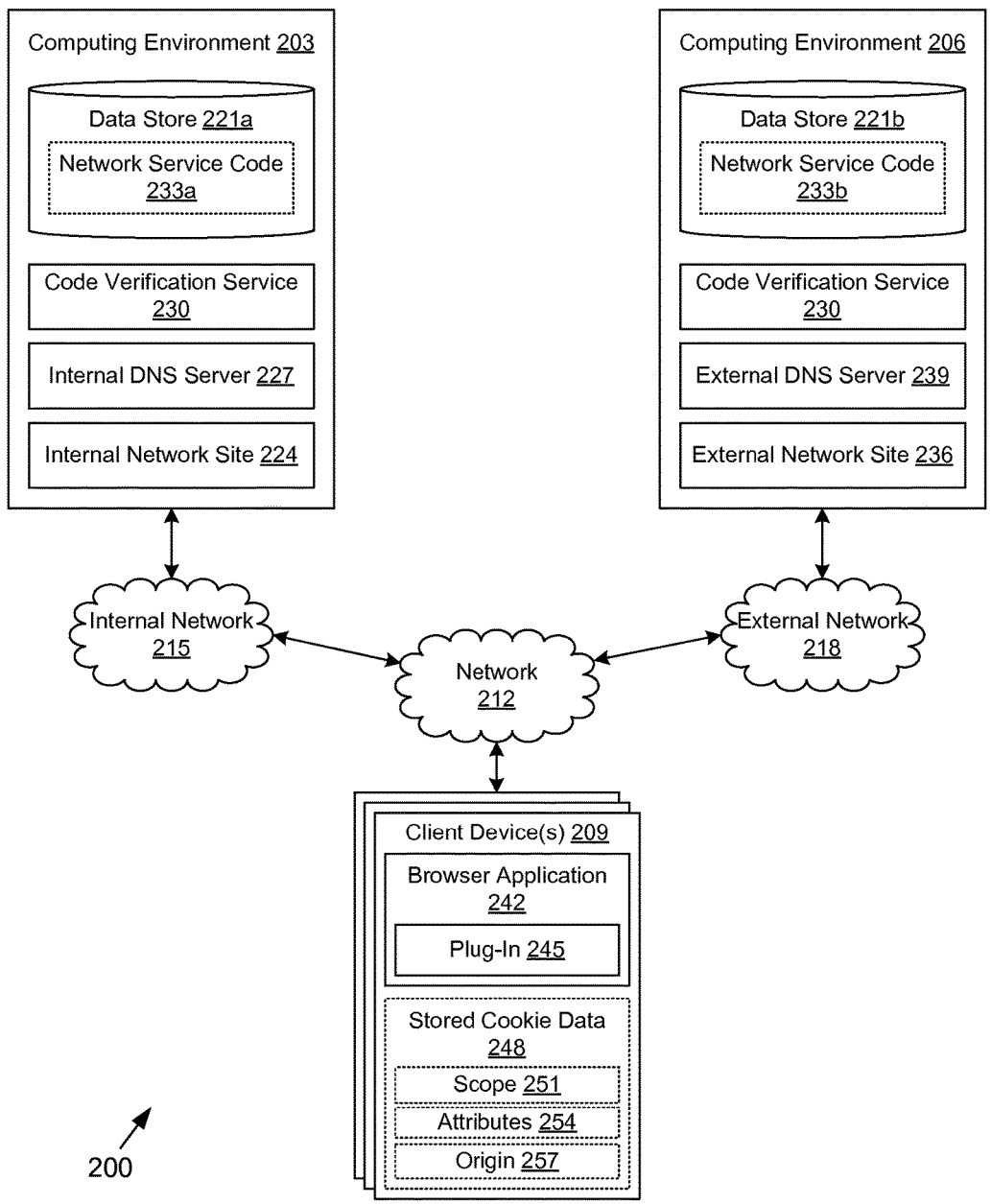
FIG. 2 is a schematic block diagram of a networked environment according to various embodiments of the present disclosure.

With reference to FIG. 2, shown is a networked environment 200 according to various embodiments. The networked environment 200 includes computing environments 203 and 206, and one or more client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks. In particular, the computing environment 203 is coupled to the network 212 by way of an internal network 215, and the computing environment 206 is coupled to the network 212 by way of an external network 218. The internal network 215 may be inaccessible from the public Internet. In one implementation, the internal network 215 may employ a private range of network addresses that are unroutable.

The computing environments 203 and 206 may be operated by a single organization having internal computing resources and external computing resources. Each of the computing environments 203 and 206 may comprise, for example, a server computer or any other system providing computing capability. Alternatively, the computing environments 203 and 206 may employ a plurality of computing devices that may be arranged, for example, in one or more server banks or computer banks or other arrangements. Such computing devices may be located in a single installation or may be distributed among many different geographical locations. For example, the computing environments 203 and 206 may include a plurality of computing devices that together may comprise a hosted computing resource, a grid computing resource, and/or any other distributed computing arrangement. In some cases, the computing environments 203 and 206 may correspond to an elastic computing resource where the allotted capacity of processing, network, storage, or other computing-related resources may vary over time. Although described separately herein, the computing environments 203 and 206 may overlap using the same physical hardware but differing in network connectivity for one or more network services.

Various applications and/or other functionality may be executed in the computing environments 203 and 206 according to various embodiments. Also, various data is stored in data stores 221a and 221b that are accessible to the respective computing environments 203 and 206. The data stores 221a and 221b may be representative of a plurality of data stores as can be appreciated. The data stored in the data stores 221a and 221b, for example, are associated with the operation of the various applications and/or functional entities described below.

The components executed by the computing environment 203, for example, include an internal network site 224, an internal domain name system (DNS) server 227, a code verification service 230, and other applications, services, processes, systems, engines, or functionality not discussed in detail herein. The internal network site 224 is executed to receive requests for resources from client devices 209 via the internal network 215 and to serve up the resources in response to the requests. In one embodiment, the internal network site 224 comprises a hypertext transfer protocol (HTTP) server such as APACHE HTTP server, MICROSOFT Internet Information Services (IIS), APACHE TOMCAT, or other servers. In other embodiments, the internal network site 224 may provide a file transfer protocol (FTP) service, a gopher protocol service, or other network services. The internal network site 224 is accessed via an associated domain name, which may be a subdomain of a high-level domain registered to the organization.

The internal DNS server 227 is executed to receive DNS queries for domain names from client devices 209 and provide network addresses in response. For example, the internal DNS server 227 may receive a DNS query for a domain name and provide an internet protocol (IP) address in response. If no corresponding domain name record exists, the internal DNS server 227 may generate an error, and thus the query will be unsuccessful. In one configuration of the computing environment 203, domain name records for internal network sites 224 are available only through the internal DNS server 227, which may be accessible only to authorized client devices 209 via the internal network 215.

The code verification service 230 is executed to analyze the network service code 233a corresponding to the internal network site 224 to determine whether any cookie-setting procedures conform to organization policies regarding cookie leakage from internal to external sites. For example, the code verification service 230 may determine whether the network service code 233a sets a cookie with a high-level domain that is common to both the computing environment 203 and the computing environment 206, which may be a source of leakage of cookie data from the computing environment 203 to the computing environment 206.

The data stored in the data store 221a includes, for example, the network service code 233a, and potentially other data. The network service code 233a corresponds to source code, object code, binary code, and/or other forms of code underlying the internal network site 224. In particular, the network service code 233a may include code configured to perform one or more cookie-setting procedures. This code may define a domain for accessibility of the cookie data along with other attributes for the cookie data.

The components executed by the computing environment 206, for example, include an external network site 236, an external DNS server 239, a code verification service 230, and other applications, services, processes, systems, engines, or functionality not discussed in detail herein. The external network site 236 is executed to receive requests for resources from client devices 209 via the external network 218 and to serve up the resources in response to the requests. In one embodiment, the external network site 236 comprises an HTTP server such as APACHE HTTP server, MICROSOFT IIS, APACHE TOMCAT, or other servers. In other embodiments, the external network site 236 may provide an FTP service, a gopher protocol service, or other network services. The external network site 236 is accessed via an associated domain name, which may be a subdomain of a high-level domain registered to the organization.

The external DNS server 239 is executed to receive DNS queries for domain names from client devices 209 and provide network addresses in response. For example, the external DNS server 239 may receive a DNS query for a domain name and provide an internet protocol (IP) address in response. If no corresponding domain name record exists, the external DNS server 239 may generate an error, and thus the query will be unsuccessful. In one configuration of the computing environment 206, domain name records for internal network sites 224 are not available through the external DNS server 239.

The code verification service 230 is executed to analyze the network service code 233b corresponding to the external network site 236 to determine whether any cookie-setting procedures conform to organization policies regarding cookie leakage from external to internal sites. For example, the code verification service 230 may determine whether the network service code 233b sets a cookie with a high-level domain that is common to both the computing environment 203 and the computing environment 206, which may be a source of leakage of cookie data from the computing environment 206 to the computing environment 203.

The data stored in the data store 221a includes, for example, the network service code 233a, and potentially other data. The network service code 233a corresponds to source code, object code, binary code, and/or other forms of code underlying the internal network site 224. In particular, the network service code 233a may include code configured to perform one or more cookie-setting procedures. This code may define a domain for accessibility of the cookie data along with other attributes for the cookie data.

The client device 209 is representative of a plurality of client devices 209 that may be coupled to the network 212. The client device 209 may comprise, for example, a processor-based system such as a computer system. Such a computer system may be embodied in the form of a desktop computer, a laptop computer, personal digital assistants, cellular telephones, smartphones, smartwatches, voice-commanded audio interfaces, set-top boxes, music players, web pads, tablet computer systems, game consoles, electronic book readers, or other devices.

The client device 209 may be configured to execute various applications such as a browser application 242 and/or other applications. The browser application 242 may be executed in a client device 209, for example, to access network content served up by the internal network site 224, the external network site 236, and/or other servers. To this end, the browser application 242 may comprise, for example, a traditional browser, a dedicated application implementing a web view, etc., and the user interface rendered by the browser application 242 may comprise a network page, an application screen, a verbal readout of content, etc. The browser application 242 may include one or more plug-ins 245 configured to prevent leakage of cookie data from internal network sites 224 to external network sites 236 and vice versa. The client device 209 may be configured to execute applications beyond the browser application 242 such as, for example, email applications, social networking applications, word processors, spreadsheets, and/or other applications.

According to policy, the organization may require that a specific browser application 242 including the plug-in 245 be employed by client devices 209 as a condition of connecting to the internal network 215. Further, the internal network site 224 and/or the external network site 236 may enforce this policy with reference to a predetermined "user-agent" string signifying the use of the approved browser application 242 and/or plug-in 245. Thus, the internal network site 224 and/or the external network site 236 may deny access to resources if the predetermined "user-agent" string is not present in the request.

The browser application 242 may store data in in the client device 209 such as stored cookie data 248 corresponding to one or more cookies set by the internal network site 224 and/or the external network site 236. The stored cookie data 248 may include payload data corresponding to session tokens, registration tokens, unique identifiers, and/or other types of data. In addition, each cookie represented by the stored cookie data 248 may be associated with a scope 251, one or more attributes 254, an origin 257, and/or other data.

The scope 251 corresponds to a domain for which access to the cookie is to be limited under a default behavior of the browser application 242. This domain may be a high-level domain, such as a top-level domain (e.g., ".com," ".biz," etc.) or a second-level domain (e.g., "company.site"). If the domain is a high-level domain, access is normally permitted by the browser application 242 to network sites having domain names that match the high-level domain exactly or are subdomains of the high-level domain. In some cases, the scope 251 may be restricted to a lower-level domain (e.g., "www.company.site") and any subdomains thereof (e.g., "external.www.company.site"). A leading dot for the domain may indicate that subdomains are permitted to match, but this formatting may not be required.

In some approaches, the scope 251 may define a specific path on a network site, where only resource requests matching the specific path are to include the cookie. For example, the scope 251 for a cookie may define a path of "/catalog" for a domain "www.company.site." In such a case, a request for a resource at "http://www.company.site/catalog" would include the cookie, but a request for a resource at "http://www.company.site/order" would not.

The attributes 254 may control how cookies are stored and distributed. For example, the attributes 254 may control an expiration of the cookie, at either a specific time or an interval of time in the future. The attributes 254 may also control whether the cookies are allowed to be transmitted over a non-encrypted connection and whether the cookies are allowed to be transmitted via non-HTTP methods (e.g., JAVASCRIPT). In one embodiment, an attribute 254 may control whether a cookie set by an internal network site 224 is permitted to be shared with an external network site 236, or whether a cookie set by an external network site 236 is permitted to be shared with an internal network site 224. Such sharing may be enabled or disabled by default. The sharing may be applicable to all sites matching the scope 251 for the cookie or to specific network sites that are enumerated and/or match a specified domain.

The origin 257 may indicate the fully-qualified domain name and/or network address of the network site that set the cookie. In other embodiments, the origin 257 may simply indicate whether the network site that set the cookie is an internal network site 224 or an external network site 236.

Figure 3:
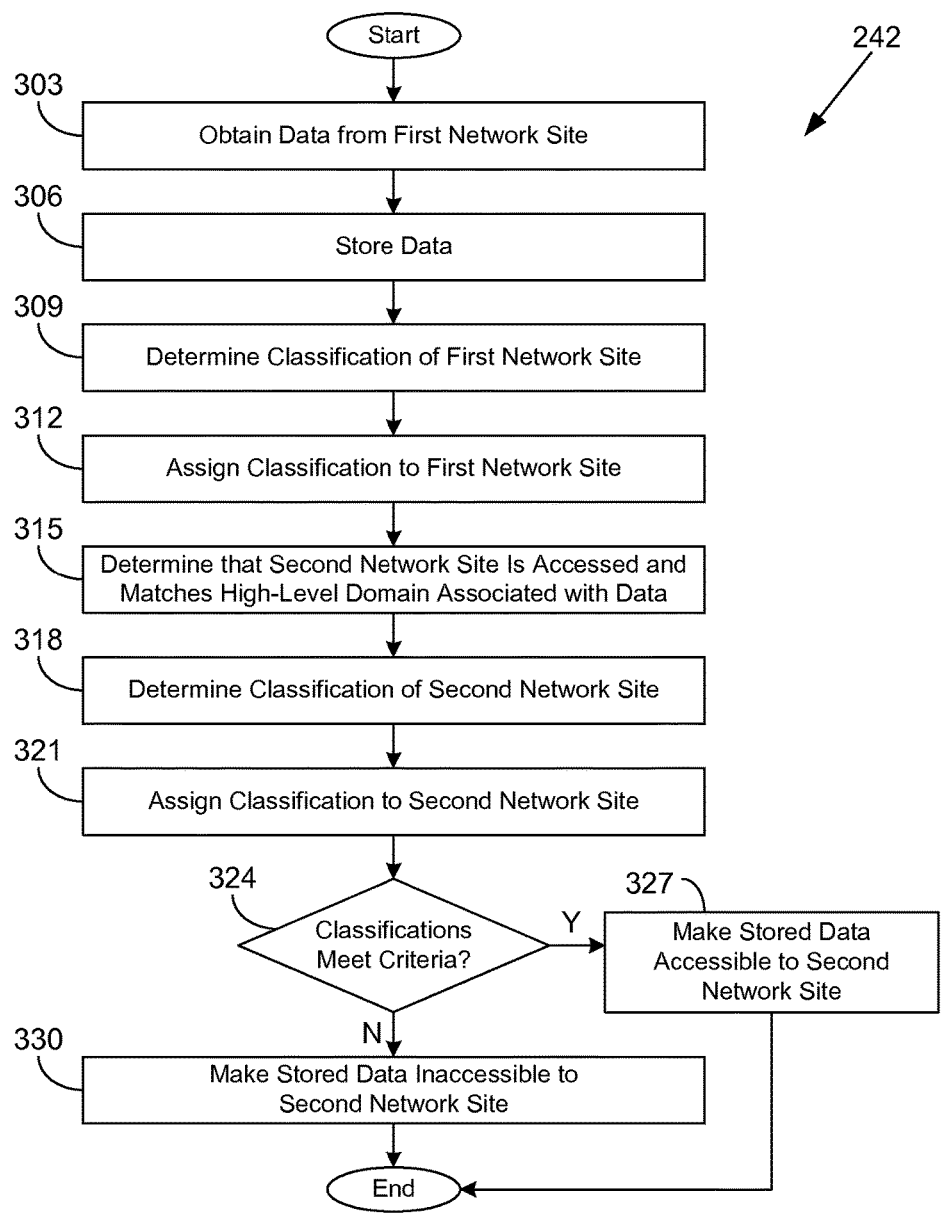
FIGS. 3 and 4 are flowcharts illustrating examples of functionality implemented as portions of a browser application executed in a client device in the networked environment of FIG. 2 according to various embodiments of the present disclosure.

Referring next to FIG. 3, shown is a flowchart that provides one example of the operation of a portion of the browser application 242 according to various embodiments. It is understood that the flowchart of FIG. 3 provides merely an example of the many different types of functional arrangements that may be employed to implement the operation of the portion of the browser application 242 as described herein. As an alternative, the flowchart of FIG. 3 may be viewed as depicting an example of elements of a method implemented in the client device 209 (FIG. 2) according to one or more embodiments. Although the functionality described with respect to FIG. 3 is attributed to the browser application 242, it is understood that some or all of the functionality may be performed by a plug-in 245 (FIG. 2) of the browser application 242.

Beginning with box 303, the browser application 242 obtains data from a first network site. The data may correspond to a cookie. In box 306, the browser application 242 stores the data in the client device 209. In box 309, the browser application 242 determines, according to one or more rules, a classification of the first network site, e.g., whether the first network site is external, internal, or another specific type. In one embodiment, the browser application 242 may issue a DNS query to each of the internal DNS server 227 (FIG. 2) and the external DNS server 239 (FIG. 2).

If the first network site is an internal network site 224 (FIG. 2), the query to the internal DNS server 227 should return successfully with a network address. However, the query to the external DNS server 239 should not return successfully. By contrast, if the first network site is an external network site 236 (FIG. 2), the query to the external DNS server 239 should return successfully with a network address, and likewise, the query to the internal DNS server 227 should return successfully with a network address.

In another embodiment, the browser application 242 may determine that the first network site is internal if its corresponding network address is in a predefined private network address range (e.g., "192.168.x.x" or "10.x.x.x"). However, in some cases, an external network site may have a private network address when resolved through an internal DNS server 227 and a public network address when resolved through an external DNS server 239. In still another embodiment, the browser application 242 may determine that the first network site is internal if its domain name matches one or more predefined strings (e.g., "internal," "inside," "intranet," etc.).

In still another embodiment, the browser application 242 may cause the first network site to be accessed from a node outside the internal network 215, where if the access is successful, the site is deemed external, and if the access is unsuccessful, the site is deemed internal. For example, the browser application 242 may send a message to a server outside the internal network 215 that will cause an access to the first network site to occur by the server. The server can then return the result (success or failure) to the browser application 242.

In still another embodiment, a network service may be queried by the browser application 242 and the response may indicate the specific classification of the first network site. The network service may, for example, maintain a database of hosts that associate the hosts with classifications or may employ a previously described approach to determine the classification.

In box 312, the browser application 242 assigns the classification to the first network site. In box 315, the browser application 242 determines that a second network site is accessed and matches a high-level domain associated with the data stored by the first network site. In customary operation, the browser application 242 would transmit the data to the second network site as a result of the match of the high-level domain. However, here, the browser application 242 proceeds to box 318 and determines, according to one or more rules, a classification of the second network site, e.g., whether the second network site is external, internal, or another specific type using one or more of the approaches described with respect to box 309. In box 321, the browser application 242 assigns the classification to the second network site.

In box 324, the browser application 242 determines whether the classifications of the first network site and the second network site meet predetermined criteria. For example, the browser application 242 may determine whether the classifications of the first network site and the second network site match. For instance, it may be determined whether both sites are internal or both sites are external. In some cases, the predetermined criteria may be met if the first network site is external and the second network site is internal, for example. If the criteria are met, the browser application 242 makes the stored data accessible to the second network site in box 327. For instance, the browser application 242 may send the stored data to the second network site in a format that may be understood by the second network site. Thereafter, the operation of the portion of the browser application 242 ends.

If, instead, it is determined that the classifications do not meet the predetermined criteria, the browser application 242 makes the stored data inaccessible to the second network site in box 330 by, e.g., refraining from sending the stored data to the second network site, sending the stored data but encrypting it first with a key that is not provided to the second network site, etc. By making the data inaccessible to the second network site, the default behavior of the browser application 242 of making the data accessible to sites having the same high-level domain may be overridden. Thereafter, the operation of the portion of the browser application 242 ends.

As described with respect to FIG. 3, data stored by internal network sites 224 are shared only with other internal network sites 224, and data stored by external network sites 236 are shared only with other external network sites 236. In other embodiments, data stored by external network sites 236 may be shared with internal network sites 224. Further, the presence of a particular sharing attribute 254 (FIG. 2) for stored data may configure sharing to be permitted between internal network sites 224 and external network sites 236 for all or a subset of sites. In some embodiments, the data may be shared if the second network site has a secure certificate with the same intermediate certificate authority as the secure certificate of the first network site. In other embodiments, the data may be shared if the second network site is associated with a certain level of privacy classification as designated by a privacy compliance registrar.

Figure 4:
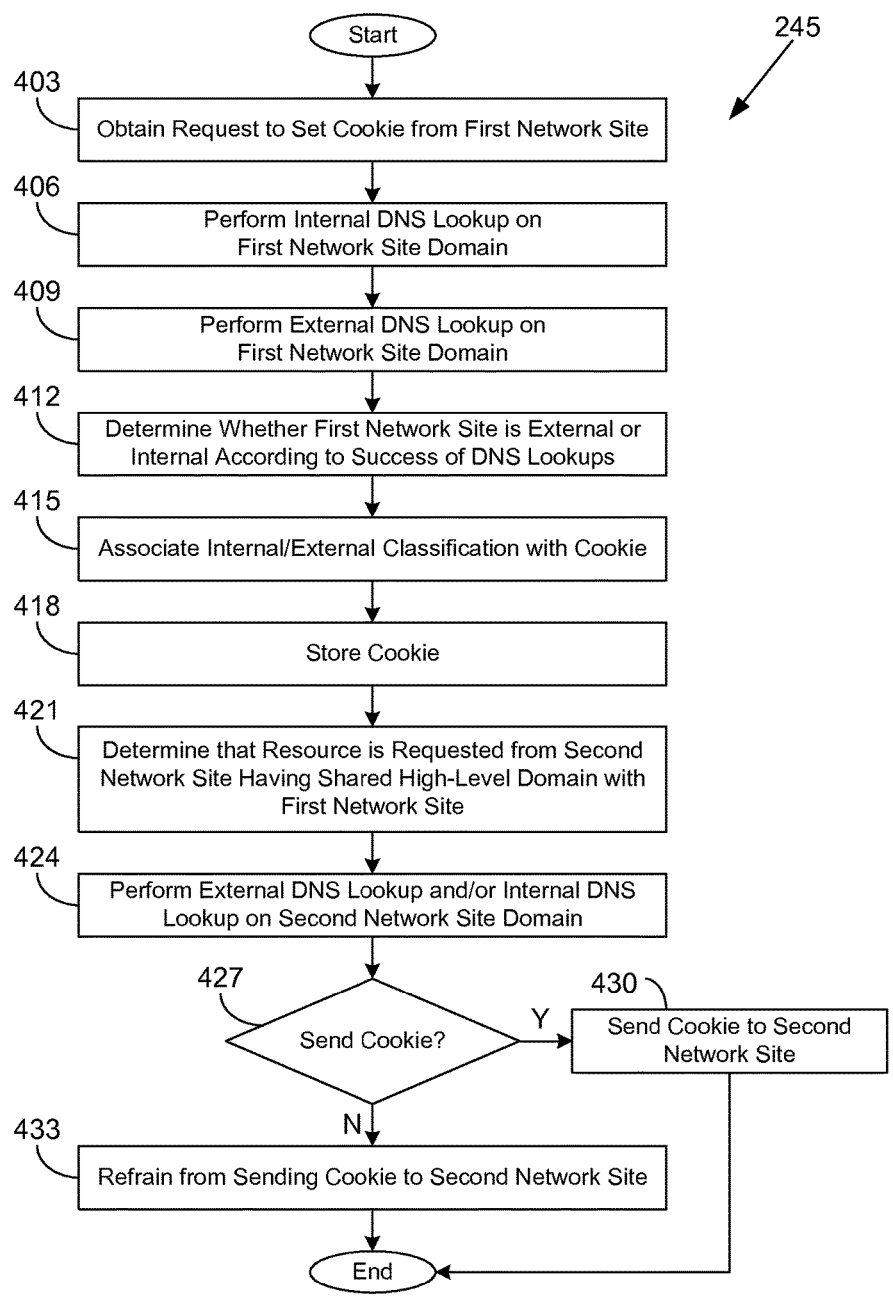

Turning now to FIG. 4, shown is a flowchart that provides an alternative example of the operation of a portion of the browser application 242 according to various embodiments. It is understood that the flowchart of FIG. 4 provides merely an example of the many different types of functional arrangements that may be employed to implement the operation of the portion of the browser application 242 as described herein. As an alternative, the flowchart of FIG. 4 may be viewed as depicting an example of elements of a method implemented in the client device 209 (FIG. 2) according to one or more embodiments. Although the functionality described with respect to FIG. 4 is attributed to the browser application 242, it is understood that some or all of the functionality may be performed by a plug-in 245 (FIG. 2) of the browser application 242.

Beginning with box 403, the browser application 242 obtains a request to set a cookie from a first network site. In box 406, the browser application 242 performs a DNS lookup on a domain name of the first network site using the internal DNS server 227 (FIG. 2). In box 409, the browser application 242 performs a DNS lookup on the domain name of the first network site using the external DNS server 239 (FIG. 2). In box 412, the browser application 242 determines whether the first network site is an internal network site 224 (FIG. 2) or an external network site 236 (FIG. 2) according to the success of the respective DNS lookups. That is to say, if the internal lookup is successful but the external lookup is unsuccessful, the first network site is an internal network site 224. Yet, if both lookups are successful, or if only the external lookup is successful, the first network site is an external network site 236.

In box 415, the browser application 242 associates the internal/external classification with the cookie. In box 418, the browser application 242 stores the cookie in the stored cookie data 248 (FIG. 2). In box 421, the browser application 242 determines that a resource is requested from a second network site. The second network site has a high-level domain that is shared with the first network site. In box 424, the browser application 242 performs an internal DNS lookup and/or an external DNS lookup on the domain name of the second network site. For instance, if the first network site is an internal network site 224, the browser application 242 may simply perform an external lookup on the domain name of the second network site and then classify the second network site as not being an internal network site 224 if the external lookup fails.

In box 427, the browser application 242 determines whether to send the cookie from the stored cookie data 248 to the second network site. A primary consideration will be whether the cookie is set by an internal network site 224, and if so whether the second network site is also internal. Likewise, if the cookie is set by an external network site 236, it may be considered whether the second network site is also external in some embodiments. In addition, factors from the attributes 254 enabling sharing between internal and external sites, setting an expiration, requiring encryption, and other factors may be considered. If the cookie is permitted to be sent, the browser application 242 sends the cookie to the second network site in box 430. Thereafter, the operation of the portion of the browser application 242 ends.

If the cookie is not permitted to be sent, the browser application 242 continues to box 433 and refrains from sending the cookie to the second network site. Thereafter, the operation of the portion of the browser application 242 ends.

In alternative embodiments, whether the first network site is internal or external may be evaluated when determining whether to provide the cookie for the second network site. For example, the origin 257 may be submitted for internal and external DNS lookups when the resource at the second network site is determined to be accessed.

Figure 5:
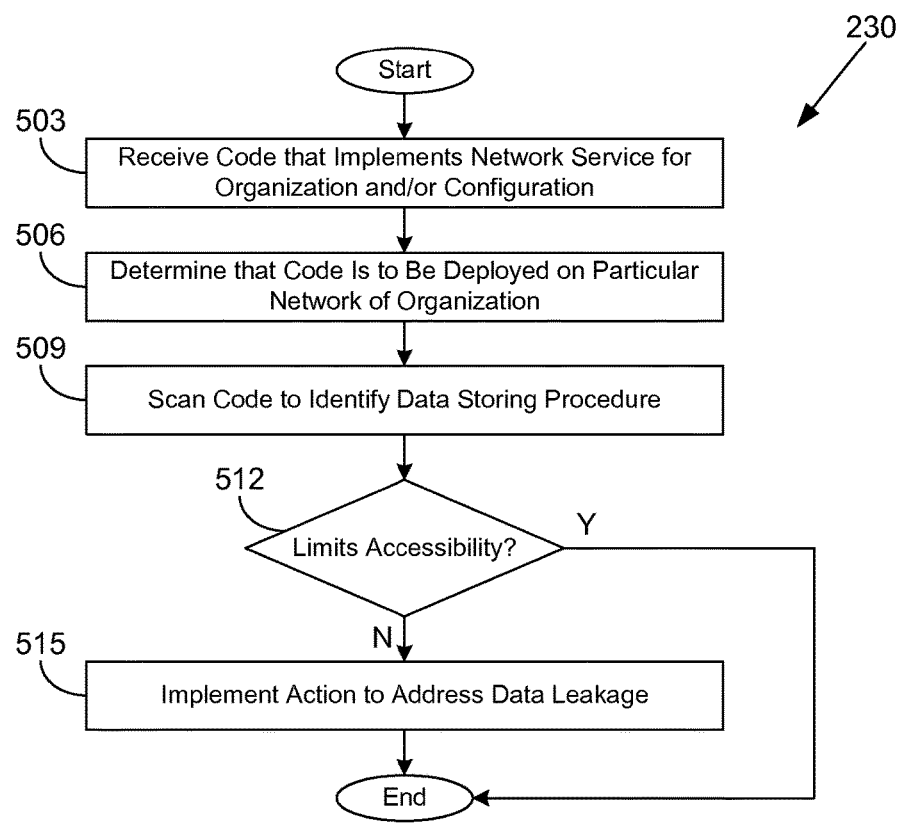
FIG. 5 is a flowchart illustrating one example of functionality implemented as portions of a code verification service executed in a computing environment in the networked environment of FIG. 2 according to various embodiments of the present disclosure.

Moving on to FIG. 5, shown is a flowchart that provides one example of the operation of a portion of the code verification service 230 according to various embodiments. It is understood that the flowchart of FIG. 5 provides merely an example of the many different types of functional arrangements that may be employed to implement the operation of the portion of the code verification service 230 as described herein. As an alternative, the flowchart of FIG. 5 may be viewed as depicting an example of elements of a method implemented in the computing environments 203 or 206 (FIG. 2) according to one or more embodiments.

Beginning with box 503, the code verification service 230 receives network service code 233a or 233b (FIG. 2) that implements a network service such as the internal network site 224 (FIG. 2) or the external network site 236 (FIG. 2) for an organization. Additionally or alternatively, a configuration for the network service may be received. In box 506, the code verification service 230 determines that the code and/or configuration is to be deployed on a particular network (i.e., the internal network 215 (FIG. 2)) of the organization. For example, the code verification service 230 may determine that the network service code 233a corresponds to an internal network site 224.

In box 509, the code verification service 230 scans the network service code 233a and/or parameters in a configuration to identify one or more data storing procedures that store data upon a client device 209 (FIG. 2). For example, the data storing procedure may be a cookie-setting procedure. In box 512, the code verification service 230 determines whether the data storing procedures properly limit accessibility to network sites on the particular network. For example, the code verification service 230 determines whether the scope 251 (FIG. 2) of the cookies set by the cookie-setting procedure excludes external network sites 236 by not corresponding to a high-level domain shared with the external network sites 236. If the data storing procedure properly limits accessibility, the operation of the portion of the code verification service 230 ends.

If instead, the code verification service 230 determines that the data storing procedure fails to properly limit accessibility of the stored data, the code verification service 230 continues to box 515 and implements one or more actions to address the potential data leakage from internal network sites 224 to external network sites 236 (FIG. 2). In this regard, the code verification service 230 may determine whether services deployed on a different network of the organization (e.g., an externally accessible network) are configured to access values in the stored data. If no external network sites 236 are so configured, it may be considered that data leakage will not occur.

The code verification service 230 may cause execution of the network service corresponding to the network service code 233a to be blocked. A notification of the improper data storing procedure may be sent to a responsible party for the network service. In some cases, the code verification service 230 may cause the network service code 233a to be modified to limit accessibility of the data to the particular network (e.g., setting the scope 251 to equal the origin 257 (FIG. 2), adding a subdomain to the scope 251, adding an attribute 254 to deny sharing of the data to the externally accessible network, enabling encryption of the stored data, etc.). Thereafter, the portion of the code verification service 230 ends.

Although the discussion of the flowchart of FIG. 5 centers on determining whether the network service code 233a employs improper data storing procedures, it is understood that the code verification service 230 may also or instead examine whether the network service code 233b employs improper data storing procedures (i.e., allowing leakage of cookie data from external to internal sites). Actions may similarly be taken to prevent such leakage.

Figure 6:
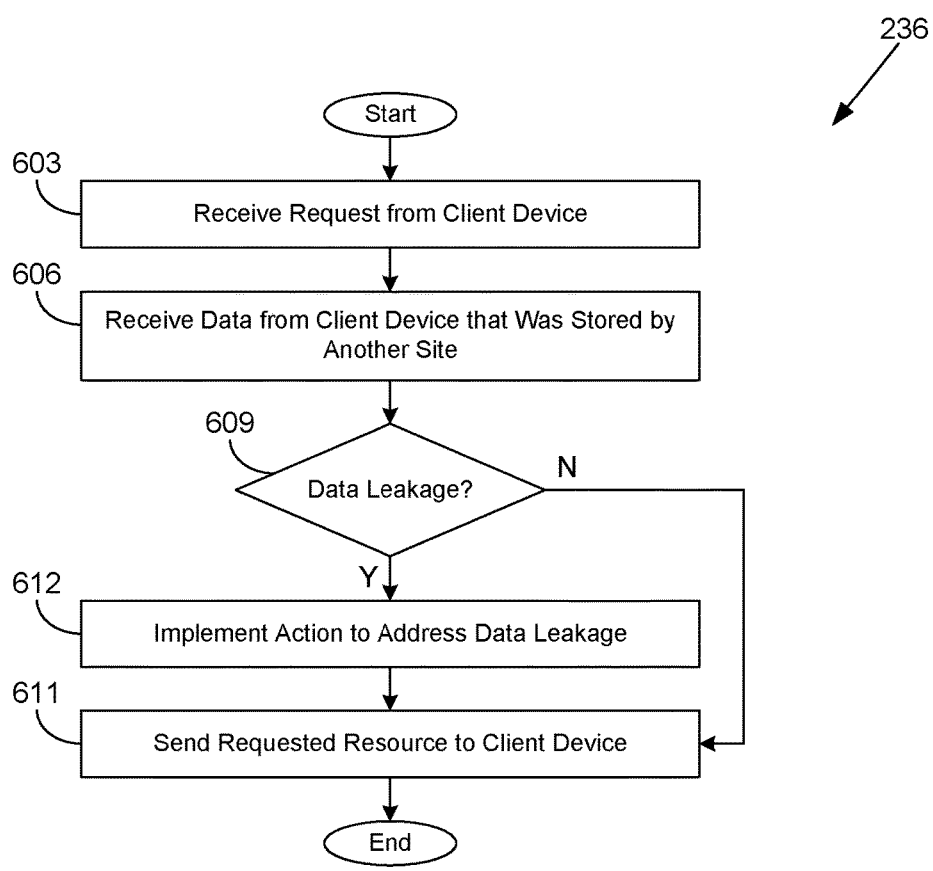
FIG. 6 is a flowchart illustrating one example of functionality implemented as portions of an external network site executed in a computing environment in the networked environment of FIG. 2 according to various embodiments of the present disclosure.

Referring next to FIG. 6, shown is a flowchart that provides one example of the operation of a portion of the external network site 236 according to various embodiments. It is understood that the flowchart of FIG. 6 provides merely an example of the many different types of functional arrangements that may be employed to implement the operation of the portion of the external network site 236 as described herein. As an alternative, the flowchart of FIG. 6 may be viewed as depicting an example of elements of a method implemented in the computing environments 203 or 206 (FIG. 2) according to one or more embodiments. Although described as an example of the external network site 236, it is understood that the flowchart of FIG. 6 may also represent the internal network site 224 (FIG. 2) in some embodiments.

Beginning with box 603, the external network site 236 receives a request from a client device 209 (FIG. 2). For example, the request may comprise an HTTP request. In box 606, the external network site 236 receives data from the client device 209 that was stored in the client device 209 by another network site. For example, the data may correspond to a cookie stored by an internal network site 224 or another external network site 236 of the same organization (i.e., having the same high-level domain).

In box 609, the external network site 236 determines whether data leakage from one network of the organization to another network of the organization has occurred or could occur as a result of the data being presented to the external network site 236. For example, predefined criteria of the organization may consider that a cookie set by an internal network site 224 should not be presented to an external network site 236. Alternatively, the predefined criteria may require that the data be encrypted so that it is inaccessible to the external network site 236. If no data leakage is deemed to occur, the external network site 236 sends the requested resource to the client device 209 in box 611. Thereafter, the operation of the external network site 236 ends.

If data leakage is deemed to occur, the external network site 236 moves to box 612 and implements one or more actions to address the data leakage. For example, the external network site 236 may cause a notification to be sent to a responsible party of the network site which stored the data. Alternatively, the external network site 236 may cause execution of the network site which stored the data to be blocked. In some cases, the external network site 236 may be able to cause the data stored in the client device 209 to be modified by erasing the data or otherwise rendering the data inaccessible other than to network sites on a particular network that originated the data. The external network site 236 sends the requested resource to the client device 209 in box 611. Thereafter, the operation of the portion of the external network site 236 ends.

Figure 7:
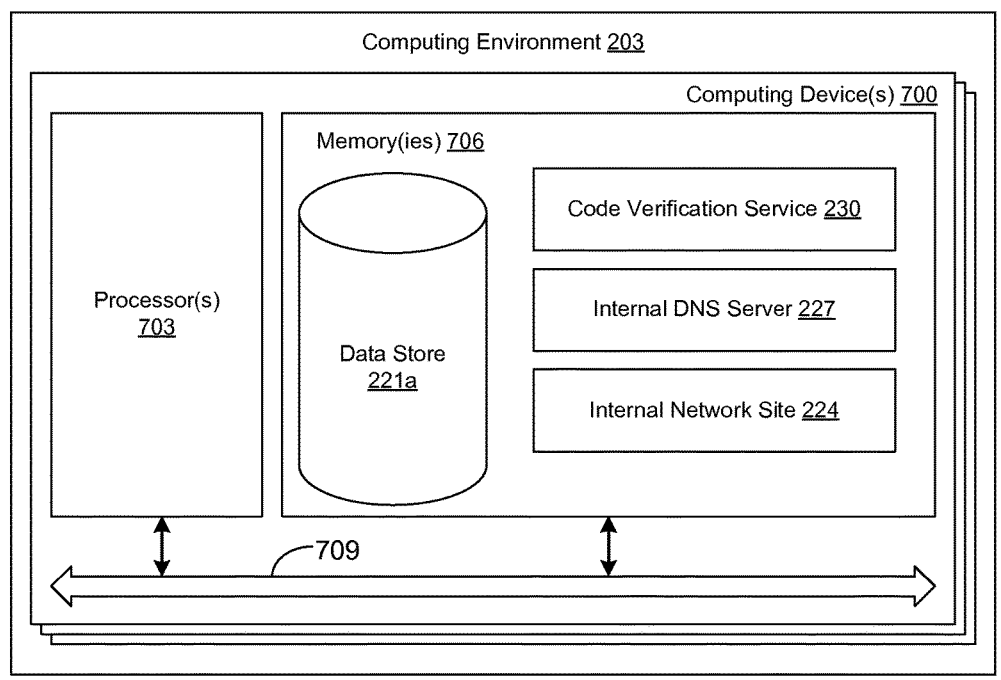
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are an internal network site 224, an internal DNS server 227, a code verification service 230, and potentially other applications. Also stored in the memory 706 may be a data store 221a and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the internal network site 224, the internal DNS server 227, the code verification service 230, the browser application 242 (FIG. 2), the external network site 236 (FIG. 2), the external DNS server 239 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the browser application 242, the code verification service 230, and the external network site 236. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the internal network site 224, the internal DNS server 227, the code verification service 230, the browser application 242, the external network site 236, and the external DNS server 239, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the internal network site 224, the internal DNS server 227, the code verification service 230, the browser application 242, the external network site 236, and the external DNS server 239, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
  receiving, via at least one of one or more computing devices, a request to set a cookie with a high-level domain from a first network site at a first domain name, the first domain name being a subdomain of the high-level domain;
  performing, via at least one of the one or more computing devices, a first domain name system (DNS) lookup on the first domain name with at least one of one or more internal DNS servers, the one or more internal DNS servers being configured to resolve domain names of internal network sites of an organization that are not accessible via the public Internet;

performing, via at least one of the one or more computing devices, a second DNS lookup on the first domain name with at least one of one or more external DNS servers, the one or more external DNS servers being incapable of resolving the domain names of the internal network sites;

determining, via at least one of the one or more computing devices, that the first DNS lookup is successful and the second DNS lookup is unsuccessful;

determining, via at least one of the one or more computing devices, that a resource is requested from a second network site at a second domain name, the second domain name being another subdomain of the high-level domain;

performing, via at least one of the one or more computing devices, a third DNS lookup on the second domain name with at least one of the one or more external DNS servers;

determining, via at least one of the one or more computing devices, that the third DNS lookup is successful; and refraining, via at least one of the one or more computing devices, from providing the cookie to the second network site.

2. The method of claim 1, further comprising classifying, via at least one of the one or more computing devices, the cookie as an internal cookie in response to determining that the first DNS lookup is successful and the second DNS lookup is unsuccessful.

3. The method of claim 1, wherein the one or more external DNS servers are configured to respond unsuccessfully to a DNS lookup on an internal domain name.

4. A system, comprising:
a client computing device; and
a browser application executed in the client computing device, wherein when executed the browser application is configured to cause the client computing device to at least:
store cookie data from a first network site in the client computing device, wherein the first network site has a high-level domain, and access to the cookie data is limited to one or more network sites also having the high-level domain under a default behavior of the browser application;
assign a first classification to the first network site;
assign a second classification to a second network site having the same high-level domain; and
make the cookie data accessible to the second network site in response to the first classification and the second classification meeting at least one predetermined criterion rather than automatically making the cookie data accessible to the second network site under the default behavior of the browser application, wherein the at least one predetermined criterion relates to at least one of: whether the first and second classifications are both an internal network, whether the first and second classifications are both an external network, whether the first and second classifications are both a same type of internal network, or whether the first and second classifications are both a same type of external network.

5. The system of claim 4, wherein when executed the browser application further causes the client computing device to at least make the cookie data inaccessible to the second network site when the first classification and the second classification do not meet the at least one predetermined criterion, thereby overriding the default behavior of the browser application.

6. The system of claim 5, wherein making the cookie data inaccessible comprises encrypting the cookie data with a key that is unavailable to the second network site.

7. The system of claim 5, wherein making the cookie data inaccessible comprises refraining from sending the cookie data to the second network site.

8. The system of claim 4, wherein the at least one predetermined criterion is met when the first classification is internal and the second classification is internal, or when the first classification is external and the second classification is external.

9. The system of claim 4, wherein the at least one predetermined criterion is not met when the first classification is a first type of internal network and the second classification is a second type of internal network.

10. The system of claim 4, wherein when executed the browser application further causes the client computing device to at least:
determine that the cookie data is associated with an attribute indicating that sharing of the data with one or more external network sites is permitted; and
send the cookie data to the second network site in response to the attribute indicating that sharing of the cookie data with the one or more external network sites is permitted.

11. The system of claim 4, wherein the high-level domain corresponds to a top-level domain or a second-level domain, the first network site has a first domain name that is a subdomain of the high-level domain, and the second network site has a second domain name that is another subdomain of the high-level domain.

12. The system of claim 4, wherein the cookie data is sent to the second network site in a hypertext transfer protocol (HTTP) request.

13. The system of claim 4, wherein when executed the browser application further causes the client computing device to at least:
perform a first domain name system (DNS) query on a domain name of the first network site with an external DNS server;
perform a second DNS query on the domain name of the first network site with an internal DNS server; and
assign the first classification to the first network site according to which of the first DNS query and the second DNS query is successful.

14. The system of claim 4, wherein when executed the browser application further causes the client computing device to at least assign the first classification to the first network site according to whether a domain name of the first network site matches a predetermined pattern.

15. The system of claim 4, wherein when executed the browser application further causes the client computing device to at least request the first classification and the second classification from a network service.

16. The system of claim 4, wherein when executed the browser application further causes the client computing device to at least:
perform a domain name system (DNS) query on a domain name of the first network site to obtain a network address; and
assign the first classification to the first network site in response to determining whether the network address corresponds to a predetermined address range.

17. A method, comprising:
storing cookie data from a first network site in a client computing device, wherein the first network site has a high-level domain, and access to the cookie data is limited to one or more network sites also having the high-level domain under a default behavior of a browser application;

assigning, by the client computing device, a first classification to the first network site;

assigning, by the client computing device, a second classification to a second network site having the same high-level domain; and making, by the client computing device, the cookie data accessible to the second network site in response to the first classification and the second classification meeting at least one predetermined criterion rather than automatically making the cookie data accessible to the second network site under the default behavior of the browser application, wherein the at least one predetermined criterion relates to at least one of: whether the first and second classifications are both an internal network, whether the first and second classifications are both an external network, whether the first and second classifications are both a same type of internal network, or whether the first and second classifications are both a same type of external network.

18. The method of claim 17, further comprising making, by the client computing device, the cookie data inaccessible to the second network site when the first classification and the second classification do not meet the at least one predetermined criterion, thereby overriding the default behavior of the browser application.

19. The method of claim 17, further comprising:

determining, by the client computing device, that the cookie data is associated with an attribute indicating that sharing of the data with one or more external network sites is permitted; and sending, by the client computing device, the cookie data to the second network site in response to the attribute indicating that sharing of the cookie data with the one or more external network sites is permitted.

20. The method of claim 17, wherein the high-level domain corresponds to a top-level domain or a second-level domain, the first network site has a first domain name that is a subdomain of the high-level domain, and the second network site has a second domain name that is another subdomain of the high-level domain.

21. A system, comprising:

at least one computing device; and at least one application executable in the at least one computing device, wherein when executed the at least one application causes the at least one computing device to at least:

receive a request to set a cookie with a high-level domain from a first network site at a first domain name, the first domain name being a subdomain of the high-level domain;

perform a first domain name system (DNS) lookup on the first domain name with at least one of one or more internal DNS servers, the one or more internal DNS servers being configured to resolve domain names of internal network sites of an organization that are not accessible via the public Internet;

perform a second DNS lookup on the first domain name with at least one of one or more external DNS servers, the one or more external DNS servers being incapable of resolving the domain names of the internal network sites;

determine that the first DNS lookup is successful and the second DNS lookup is unsuccessful;

determine that a resource is requested from a second network site at a second domain name, the second domain name being another subdomain of the high-level domain;

perform a third DNS lookup on the second domain name with at least one of the one or more external DNS servers;

determine that the third DNS lookup is successful; and refrain from providing the cookie to the second network site.

* * * * *